United States Patent [19]
Verini

[11] Patent Number: 5,588,984
[45] Date of Patent: Dec. 31, 1996

[54] APPARATUS AND METHOD TO INTERMITTENTLY MANUFACTURE AND DISPENSE NITROGEN

[76] Inventor: Nicholas A. Verini, 404 Lone Eagle Point, Lafayette, Colo. 80026

[21] Appl. No.: 503,596

[22] Filed: Jul. 18, 1995

[51] Int. Cl.$^6$ ................................................. B01D 53/22
[52] U.S. Cl. .................. 95/15; 95/18; 95/19; 95/51; 95/52; 95/54; 96/4; 96/7; 96/10; 55/267
[58] Field of Search .............................. 95/1, 14, 15, 18, 95/19, 22–24, 45, 51, 52, 54; 96/4, 7–10; 55/267–270

[56] References Cited

U.S. PATENT DOCUMENTS

| Re. 33,678 | 9/1991 | Campbell et al. | 96/4 X |
|---|---|---|---|
| 1,427,529 | 8/1922 | Gibbs et al. | |
| 3,140,931 | 7/1964 | McRobbie | 55/25 |
| 3,208,574 | 9/1965 | Anson | 194/3 |
| 3,976,451 | 8/1976 | Blackmer et al. | 96/7 |
| 3,979,190 | 9/1976 | Hedman | 96/7 |
| 4,180,388 | 12/1979 | Graham et al. | 96/8 X |
| 4,236,622 | 12/1980 | Stevenson | 194/87 |
| 4,289,225 | 9/1981 | Scholta | 19/9 |
| 4,348,213 | 9/1982 | Armond | 55/25 |
| 4,681,602 | 7/1987 | Glenn et al. | 96/4 X |
| 4,781,907 | 11/1988 | McNeill | 95/54 X |
| 4,810,265 | 3/1989 | Lagree et al. | 55/26 |
| 4,823,570 | 4/1989 | Jurek | 70/129 |
| 4,881,953 | 11/1989 | Prasad et al. | 96/10 X |
| 4,894,068 | 1/1990 | Rice | 95/52 X |
| 4,944,776 | 7/1990 | Keyser et al. | 96/8 X |
| 5,004,482 | 4/1991 | Haas et al. | 55/16 |
| 5,030,251 | 7/1991 | Rice et al. | 96/8 X |
| 5,053,058 | 10/1991 | Mitariten | 95/51 X |
| 5,069,692 | 12/1991 | Grennan et al. | 96/4 |
| 5,102,432 | 4/1992 | Prasad | 96/9 X |
| 5,118,327 | 6/1992 | Nelson et al. | 96/4 X |
| 5,131,929 | 7/1992 | Brockmann et al. | 96/4 X |
| 5,302,189 | 4/1994 | Barbe et al. | 95/54 |
| 5,378,263 | 1/1995 | Prasad | 96/9 X |
| 5,388,413 | 2/1995 | Major et al. | 62/11 |
| 5,425,801 | 6/1995 | Prasad | 95/54 X |
| 5,429,662 | 7/1995 | Fillet | 96/4 X |
| 5,470,379 | 11/1995 | Garrett | 96/4 |
| 5,496,388 | 3/1996 | Tellier | 96/4 X |

FOREIGN PATENT DOCUMENTS

| 60-014923 | 1/1985 | Japan | 96/4 |
|---|---|---|---|
| 63-218232 | 9/1988 | Japan | 96/4 |
| 3-242305 | 10/1991 | Japan | 96/4 |

OTHER PUBLICATIONS

Goodyear Intr. Application Bulletin 17 (Sep. 1985) pp. 3–8.
Sperberg—Stonger Longer Tires of El Paso, Inc. (Jan. 1985) pp. 1–11.

*Primary Examiner*—Robert Spitzer
*Attorney, Agent, or Firm*—Thomas J. Loran

[57] ABSTRACT

Essentially pure nitrogen gas is produced from air and stored by an intermittent, automatic, and unattended process that is compact and self contained. Air is first filtered, compressed and enters a nitrogen module containing a permeable membrane that selectively separates nitrogen from the air and discharges oxygen and other gases. The nitrogen gas then flows into a vessel for storage. The apparatus is enclosed in a housing where automated temperature and pressure controls allows the permeable membrane to separate air components. A discharge hose allows use of the nitrogen product for a variety of intermittent applications including vending for inflation of tires, filling portable nitrogen vessels, and use in other processes needing intermittent and automatic manufacture of nitrogen gas.

19 Claims, 3 Drawing Sheets

APPARATUS AND METHOD TO INTERMITTENTLY MANUFACTURE AND DISPENSE NITROGEN

BACKGROUND OF THE INVENTION

1. Field of the Invention

The present invention is generally directed to an apparatus and method for intermittent manufacturing and storing nitrogen gas, separated from air, using a permeable membrane in a compact, automatic, and unattended process. The nitrogen may be used in product manufacturing processes, inflating tires, vending to customers for tire inflation, filling portable nitrogen vessels, and other applications by people needing nitrogen.

2. Description of the Prior Art

Nitrogen manufacture from air by separating the oxygen and nitrogen has been accomplished by selective absorbent materials, distillation of liquid air, and membrane separation. These processes produce nitrogen for industrial uses such as chemical manufacture, inert gas welding, purging of explosive environments prior to electric arc cutting or welding, and food preservation. Also these processes are mostly continuous nitrogen production to the industrial process or to continually fill large storage containers. U.S. Pat. Nos. 5,302,189; 5,004,482; 4,810,265; 4,348,213; and 3,140,931 describe these manufacturing processes and industrial uses. The absorbent materials, although efficient, require regeneration of absorbent materials.

U.S. Pat. No. 5,388,413 describes a portable nitrogen source for continuously producing nitrogen at various sites with flow rates controlled by restrictor assembly (item 60, col. 3 line 67) adjusted manually to control operation. This patent uses a membrane for gas separation with air cooling and then air heating to provide proper temperatures to control the membrane temperature for gas separation. Although these provisions may be sufficient for continuous generation of nitrogen gas, the patent is not adequate to provide proper separation on start up or intermittent operation. Pressure controls are manually adjusted and temperatures are inadequate for proper gas separation until steady state production of nitrogen occurs. For intermittent and unattended production, immediate separation of nitrogen from air is needed when starting or oxygen will dilute the nitrogen. The prior art processes also require operators to produce the nitrogen gas.

U.S. Pat. Nos. 4,452,341; 4,289,225; 4,236,622; 3,208, 574; and 1,427,529 relate to the intermittent supply of air. These patents supply air for inflating tires.

Publications such as Goodyear Application Bulletin no. 17 (09–85), Longer Tires, (01–95) describe the advantages of using nitrogen rather than air for safety, longer life, and therefore less cost. However, there is no system found in the prior art that provides compact, intermittent, and automatic production of essentially pure nitrogen for manufacturing, consumers, or tire inflation.

SUMMARY OF THE INVENTION

The invention produces and stores essentially pure nitrogen gas from air on an intermittent, automatic, and unattended process that is compact and self contained. Air is first filtered, compressed, and may be dehydrated. The air then enters a nitrogen module containing a permeable membrane that selectively separates nitrogen from the air and discharges oxygen and other gases. The nitrogen gas then flows into a vessel for storage. This vessel may also support the housing for the entire apparatus. A discharge hose allows use of the nitrogen product for a variety of intermittent applications including inflation of tires, packaging of items in an inert atmosphere, making special mixtures of air with nitrogen, and allowing filling of portable vessels for use at other sites.

The apparatus is enclosed in a housing where a heater maintains components at a constant temperature during operation and standby. The temperature control of the apparatus allows instantaneous and intermittent separation of the air gaseous components through the permeable membrane that requires this temperature for ideal separation, prevents freezing of any moisture that is separated from the air, and maintains the temperature of the stored nitrogen.

For proper separation of nitrogen from air the apparatus air and nitrogen pressures must also be controlled during operation and on standby. The combined pressure and temperature control at all times permits intermittent and unattended manufacturing of nitrogen gas for consumer use or vending. A signal means for sensing a need to manufacture nitrogen from air automatically starts, produces, and stores or ejects a desired amount of nitrogen gas.

A means for vending an amount of nitrogen for personal use may be added to the apparatus. The housing for this use may be made secure.

Accordingly, an object of the invention is to provide an apparatus and method for producing nitrogen from air by intermittent manufacturing, using a permeable membrane in an automatic and unattended process.

Another object of the invention is to provide an enclosed environment for the apparatus with temperature controls to maintain the permeable membrane and other components at a proper temperature for instantaneous and complete air component separation during nitrogen gas manufacturing operation and during standby readiness.

Another object of the invention is to provide an automatic means for maintaining proper pressures during the nitrogen gas manufacturing operation and standby readiness.

Another object of the invention is to provide a means for vending of the nitrogen from a secure, enclosed container to consumers for inflating tires and filling portable vessels.

Another object of the invention is to provide an automatic means for intermittent nitrogen supply for manufacturing processes needing nitrogen.

DETAILED DESCRIPTION OF THE PREFERRED EMBODIMENT

Figure 1:
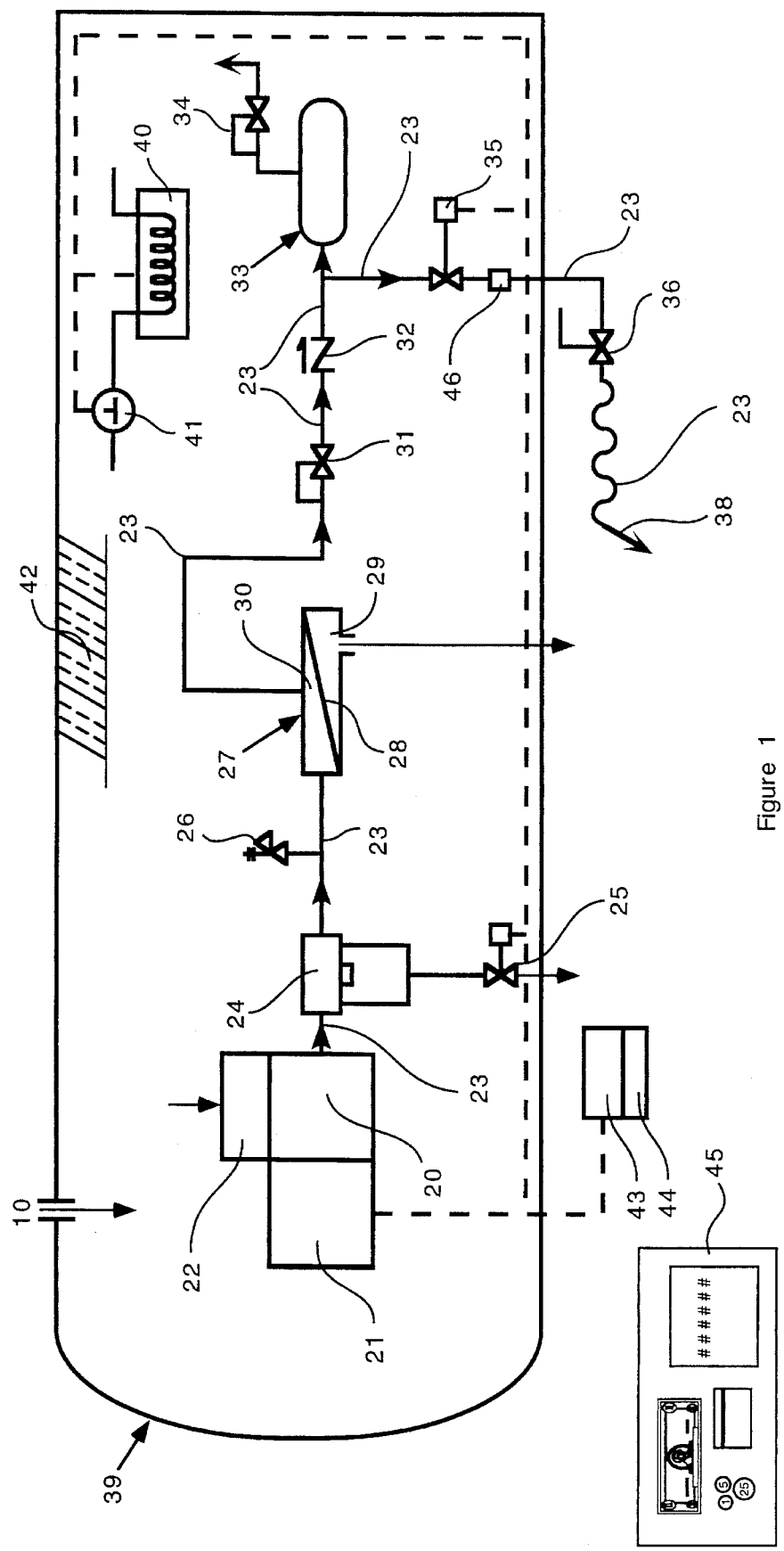
FIG. 1 is a schematic drawing of a method and apparatus to produce nitrogen from air by an intermittent, automatic, and unattended process.

The present invention method and apparatus shown in FIG. 1 includes an air compressor 20, preferably an oilless and reciprocating type, having an integral or attached electric motor 21 drawing atmospheric air 10 through a filter 22. The compressor is sized to produce the correct amount of air flow to deliver desired nitrogen product quantities. The compressed air flows through conduit 23, constructed from plastic and/or metal tubing or pipe, either rigid or flexible, to an optional means for separating excessive moisture from the air 24. This moisture separating means includes a coalescing filter or similar device that removes the moisture with a means for draining liquid water 25. Moisture may also be removed from air by inducing centrifugal flow, selective absorbent or adsorbent, selective membrane separation, or other devices. In a coalescing filter moisture and other particles coalesce on a filter and fall to the coalescing filter bottom. The means for liquid water purging is preferably accomplished with an automatic valve 25 preferably automatically activated by the intermittent cycles of operation or other time related device.

The compressed air then enters a permeable membrane module 27. This module comprises a membrane means 28 for essentially separating nitrogen from other air components 29. The membrane means may be arranged singularly, parallel, or series constructed in hollow fiber form, or in spiral wound, pleated sheet or in any other desired configuration. The air enters the module and oxygen, carbon dioxide, moisture and other gases 29 passes through the membrane and is purged from the container while the nitrogen 30, enriched to desired purity by the removal of other air components, flows out of the module through a conduit 23. The materials used in the construction of membranes are described in U.S. Pat. No. 5,388,413. A manufacturer of the membrane is Medal™ in Newport, Del. For larger production capacities of nitrogen, a plurality of modules 27 may be added in parallel. For increased nitrogen purity, the modules may be added in series.

An automatic back pressure control valve or a safety valve 26 is used to prevent over pressure of the system including the permeable membrane in the permeable membrane module. A valve setting in range of 150 psig pressure is preferred although other pressures may also be set.

The nitrogen gas flows through conduit 23 to a means for automatic controlling permeable membrane module pressure such as a back pressure valve 31, a check valve 32, and then into a means 33 for storing nitrogen gas. The purity of the nitrogen gas arriving at the storage means depends upon the back pressure maintained in the module. Preferably, a back pressure valve 31 that automatically controls the module pressure is recommended. However orifices, venturi restrictions, flow control valves, or other automatic pressure means may also be used. The back pressure determines the differential pressure between the nitrogen side and the exhaust gas side of the permeable membrane and the dwell time of the gas stream within the permeable membrane module 27. For example a back pressure setting of 90 psig results in about 20 standard cubic feet of nitrogen gas per hour having a purity of 98%–99%. For this gas production rate, the compressor 20 is sized to be 2½ times larger capacity. The means for controlling module pressure may also be located after a means for storing gas although the first location is preferred.

The means for storing nitrogen gas 33 may be any shape vessel designed to contain nitrogen gas at desired storage pressures. In the example above, the pressure in the tank would be about 90 psig although other pressures may be used. One means for storing nitrogen may be a column shaped to support a means for enclosing the apparatus. Although a support column could be cylindrical shaped, other shapes may also be used for support. The means for storing gas may be constructed from metals such as steel, aluminum, or alloys of those materials. Plastics with or without reinforcing may also be used for a means to store nitrogen gas. These include polyester, ABS, nylon, and other thermoplastics or thermosetting plastics or elastomers provided they withstand the pressures needed for storage of nitrogen gas. A relief valve or a back pressure control valve 34 may be connected to the vessel means to limit the amount of pressure in the means for storing nitrogen gas.

Nitrogen from the storage means flows through conduit 23 to a means for dispensing the gas. The means may include a solenoid or other automatic valve 35 and/or a manual operated valve 36. The combination of an automatic valve and a manual valve would be used in vending applications. A flow meter 46 may be added to indicate or record the amount of nitrogen flow. A factory needing intermittent and automatic production of nitrogen could elect to use only an automatic valve or only a manual valve for a means for dispensing nitrogen. For tire inflation, filling portable vessels, or other uses, the means for dispensing nitrogen could include flexible hoses 23 and an air chuck 38.

The means for enclosing the apparatus 39 prevents tampering, allows access for maintenance, and aids in providing a temperature controlled environment. The enclosure is preferably constructed from metal surrounding the entire apparatus. The metals include aluminum, steel, and alloys of metals. Thermosetting plastics such as polyesters, nylons with or without reinforcing fibers may also be used. Some thermoplastic materials such as polypropylene, ABS, and PVC or other plastics with or without reinforcing may also be used. Where vandalism is not a problem, other materials such as wood may be used. The means for enclosing the apparatus may have compartments for various parts of the apparatus.

Providing a constant warm temperature of about 110° F. for the air and the permeable membrane module permits intermittent use with immediate production of nitrogen. The means for providing temperature control preferably uses electrical resistant heaters 40, thermostats 41, and insulation 42. Heat produced by the air compressor also aids in controlling the temperature of the nitrogen and components in the enclosure means. Preferably, the inner surface of the means for enclosing the apparatus is insulated and the volume surrounding the apparatus is heated. The means for providing temperature control includes insulation made from inorganic materials including fiberglass and other fibers, organic materials including plastic foams, and wood products. Polyurethane foams and polystyrene foams are possible plastic foams. Biodegradable insulation may also be used. Plastic sheeting or layers are also included as insulation possibilities. A volume containing a vacuum may also provide the desired insulation.

A means for controlling the operation of the electrical and other components of the apparatus 43 is attached to the apparatus. This means is designed to initiate the compressor on demand and any appropriate controls to produce a desired amount of nitrogen gas. The indication and control parameters in this means may include temperatures, pressures, valve positions, flow indicators or recorders, compressor power, timing devices, electrical power, and gas analyzers. Appropriate controls include compressor operation, discharge pressure, flow valves, and/or timing devices for these controls to allow determined amounts of nitrogen to be vended. One method would be a timing device to power the compressor until a determined amount of nitrogen gas is produced.

A means for vending nitrogen gas 44 allows customers to financially activate the invention apparatus to obtain a desired amount of nitrogen gas. The means for vending nitrogen gas includes activation by bills, coins, credit cards and codes such as numbers and or letters 45, to authorize the means to produce nitrogen gas. This device may be made tamper proof as described in prior art or other means.

Figure 2:
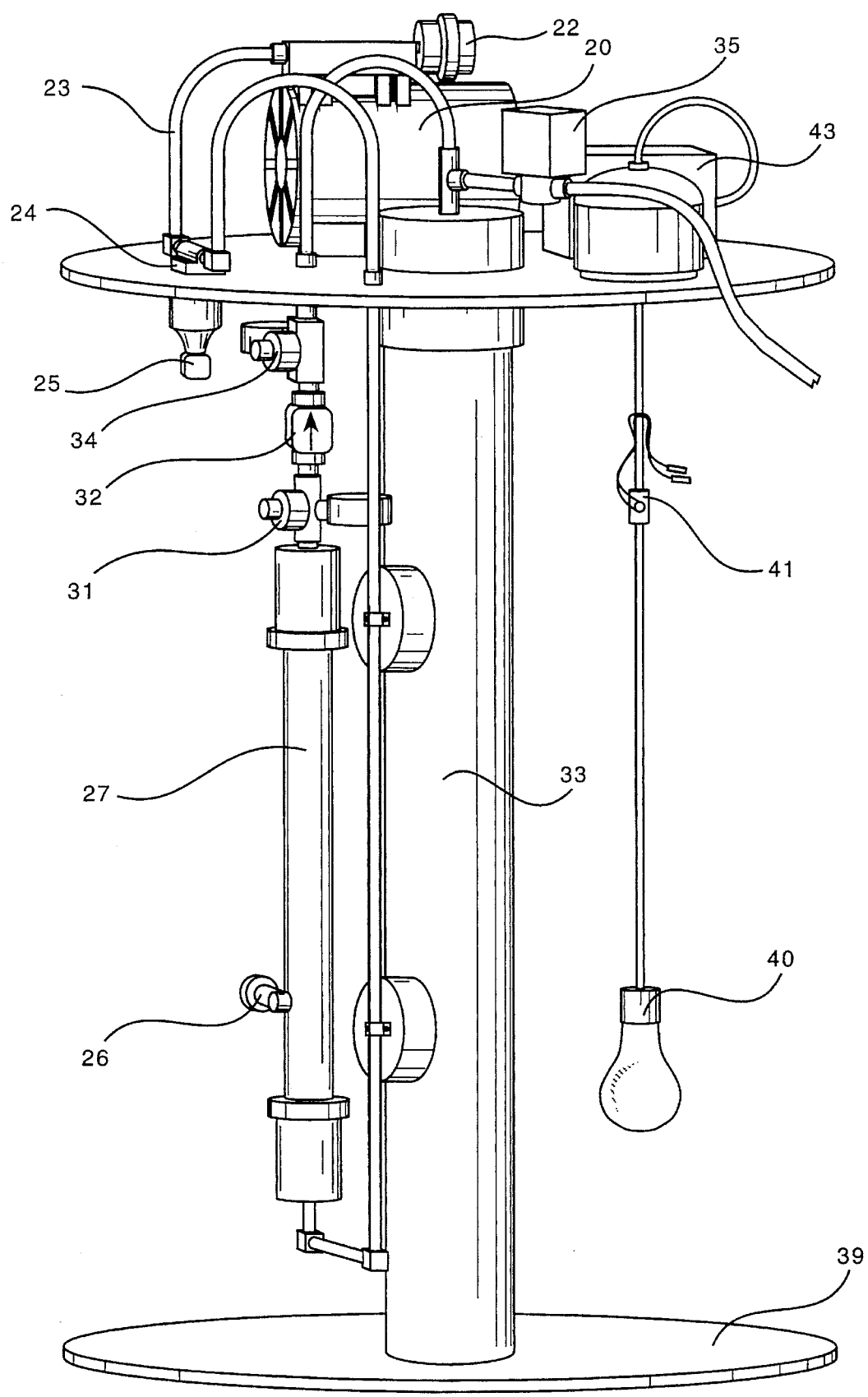
FIG. 2 is perspective pictorial drawing of the apparatus in a sectional view showing one assembly method of the apparatus.

FIG. 2 is perspective pictorial view of the apparatus in a with the means for enclosing partially removed to show one assembly method of the apparatus. An upper compartment encloses some of the apparatus as shown. The apparatus components are identified identically to FIG. 1. The means for storing nitrogen gas, 33, also provides support for the apparatus.

Figure 3:
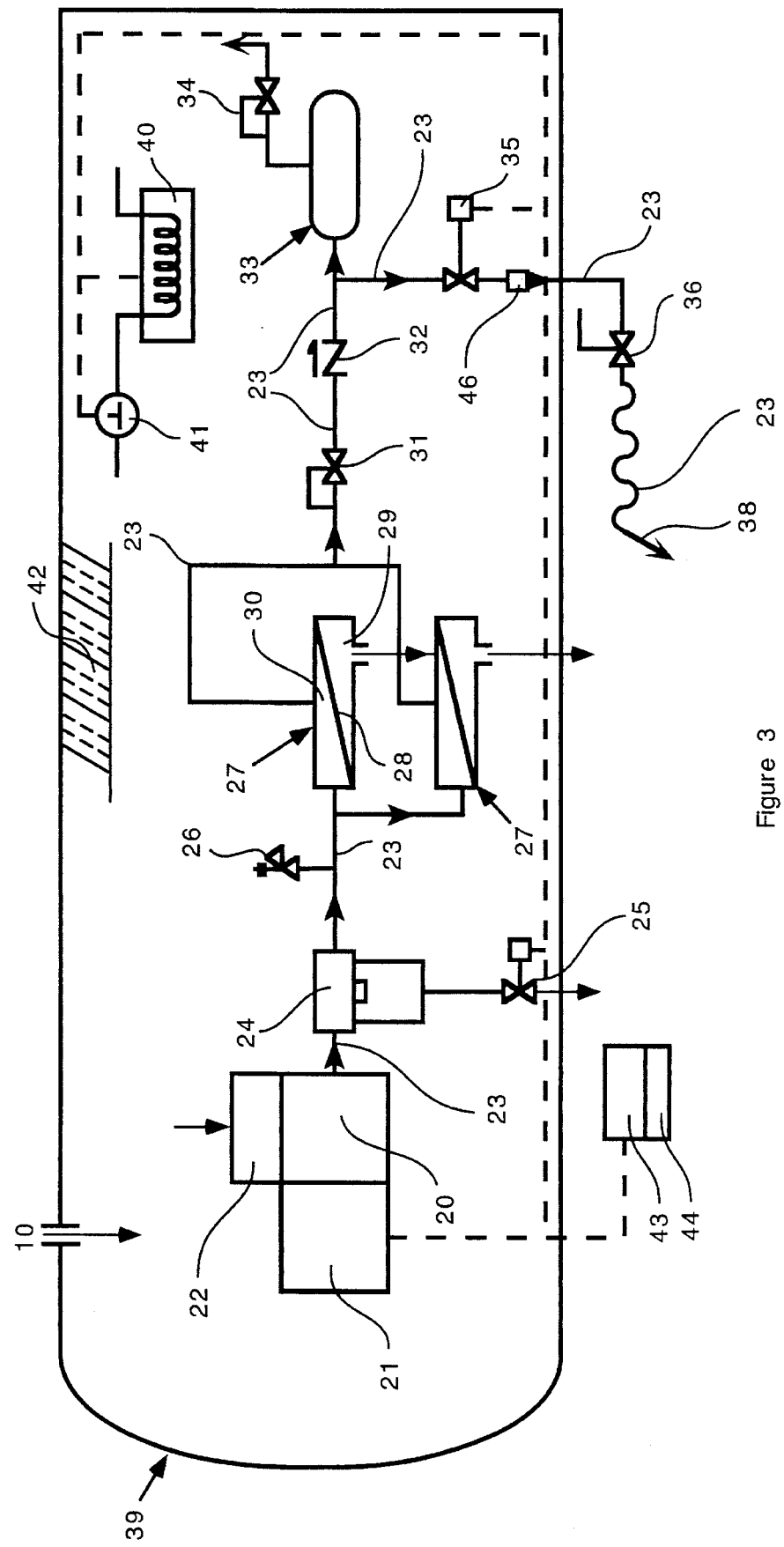
FIG. 3 is an alternative embodiment of the present invention.

FIG. 3 is schematic drawing of a method and apparatus to produce nitrogen from air by an intermittent, automatic, and unattended process using a plurality of modules to separate nitrogen from air. The apparatus uses the same identification numbers as described in FIG. 1. A plurality of modules having a membrane for separating nitrogen gas from air 27 may be added in parallel to increase nitrogen manufacturing quantities or in series to increase nitrogen purity.

From the above description of the invention, various changes and modifications to the apparatus will occur to those skilled in the art. All such modifications coming from within the scope of the amended claims are intended to be included therein.

I claim:

1. A method for intermittent and automatic separating and storing nitrogen from air comprising the steps of:
   (a) compressing and introducing said air into a module containing a permeable membrane means for separating said nitrogen from said air,
   (b) said permeable membrane means separating said nitrogen from said air permitting oxygen, carbon dioxide, moisture and other gases to pass through said membrane means while enriching said nitrogen to a desired purity by removing other air components,
   (c) providing an automatic means for controlling nitrogen pressure in said module,
   (d) providing a means for containing and controlling the temperature of said air, said nitrogen, and said module,
   (e) storing said nitrogen for intermittent discharge,
   (f) providing a means for automatically controlling and discharging desired amounts of said nitrogen and,
   (g) providing conduit to contain said air and said nitrogen in said apparatus when necessary until discharge.

2. A method for intermittent and automatic separating and storage of nitrogen from air as recited in claim 1 wherein said means for automatic controlling said nitrogen pressure in said module is a back pressure control valve.

3. A method for intermittent and automatic separating and storage of nitrogen from air as recited in claim 1 wherein said means for containing and controlling said temperature is selected from a group consisting of heat generated by an air compressor, insulation, a thermostat, and a resistance heater to control said temperature.

4. A method for intermittent and automatic separating and storage of nitrogen from air as recited in claim 1 further comprising a means for separating water from said air.

5. A method for intermittent and automatic separating and storage of nitrogen from air as recited in claim 1 wherein said means for automatically controlling and discharging desired amounts of said nitrogen contains a means for vending said nitrogen activated by financial means selected from the group consisting of bills, coins, credit cards, and codes.

6. A method for intermittent and automatic separating and storage of nitrogen from air as recited in claim 1 further comprising a plurality of said modules containing permeable membrane means for separating said nitrogen from said air.

7. An apparatus for intermittent and automatic separating of nitrogen from air comprising:
   (a) an air compressor for introducing pressurized said air to a module containing a permeable membrane means for separating said nitrogen from said air,
   (b) said permeable membrane means for separating said nitrogen from said air permits oxygen, carbon dioxide, moisture and other gases to pass through said permeable membrane means for separating while said nitrogen enriches to a desired purity by removal of other air components,
   (c) a means for automatic controlling nitrogen pressure in said module,
   (d) a means for storing said nitrogen,
   (e) conduit to contain said air and said nitrogen in said apparatus when necessary until discharge,
   (f) a means for containing said apparatus and providing controlled temperature to said permeable membrane means and said nitrogen and,
   (g) a means for automatically controlling and discharging desired amounts of said nitrogen.

8. An apparatus for intermittent and automatic separating of nitrogen from air as recited in claim 7 wherein said means for automatic controlling said nitrogen pressure in said module is a back pressure control valve.

9. An apparatus for intermittent and automatic separating of nitrogen from air as recited in claim 7 wherein said means for storing said nitrogen is a column shaped supporting member for said means for containing said apparatus.

10. An apparatus for intermittent and automatic separating of nitrogen from air as recited in claim 7 wherein said means for containing said apparatus and providing controlled temperature to said permeable membrane means and said nitrogen is selected from a group consisting of heat generated by said air compressor, insulation, a thermostat, and a resistance heater.

11. An apparatus for intermittent and automatic separating of nitrogen from air as recited in claim 7 further comprising a means for separating water from said air.

12. An apparatus for intermittent and automatic separating of nitrogen from air as recited in claim 11 further comprising an automatic valve for discharging said water from said means for separating water from said air.

13. An apparatus for intermittent and automatic separating of nitrogen from air as recited in claim 7 wherein said means for automatically controlling and discharging desired amounts of said nitrogen further comprising a means for vending said nitrogen activated by financial means selected from the group consisting of bills, coins, credit cards, and codes.

14. An apparatus for intermittent and automatic separating of nitrogen from air comprising:
   (a) an air compressor for introducing pressurized said air to a plurality of modules containing permeable membrane means for separating said nitrogen from said air,
   (b) said permeable membrane means for separating said nitrogen from said air permits oxygen, carbon dioxide, moisture and other gases to pass through said permeable membrane means for separating while said nitrogen enriches to a desired purity by removal of other air components,
   (c) a means for automatic controlling nitrogen pressure in said modules, (d) a means for storing said nitrogen, (e) conduit to contain said air and said nitrogen in said apparatus when necessary until discharge, (f) a means for containing said apparatus and providing controlled temperature to said permeable membrane means and said nitrogen and, (g) a means for automatically controlling and discharging desired amounts of said nitrogen.

15. An apparatus for intermittent and automatic separating of nitrogen from air as recited in claim 14 wherein said means for automatic controlling said nitrogen pressure in said module is a back pressure control valve.

16. An apparatus for intermittent and automatic separating of nitrogen from air as recited in claim 14 wherein said means for containing said apparatus and providing controlled temperature to said permeable membrane means and said nitrogen is selected from a group consisting of heat generated by said air compressor, insulation, a thermostat, and a resistance heater.

17. An apparatus for intermittent and automatic separating of nitrogen from air as recited in claim 14 further comprising a means for separating water from said air.

18. An apparatus for intermittent and automatic separating of nitrogen from air as recited in claim 17 further comprising an automatic valve for discharging said water from said means for separating water from said air.

19. An apparatus for intermittent and automatic separating of nitrogen from air as recited in claim 14 wherein said means for automatically controlling and discharging desired amounts of said nitrogen further comprising a means for vending said nitrogen activated by financial means selected from the group consisting of bills, coins, credit cards, and codes.

* * * * *